Dec. 19, 1950        H. C. RHODES        2,534,734
METHOD OF MAKING BREAD
Filed Feb. 10, 1945        4 Sheets-Sheet 4
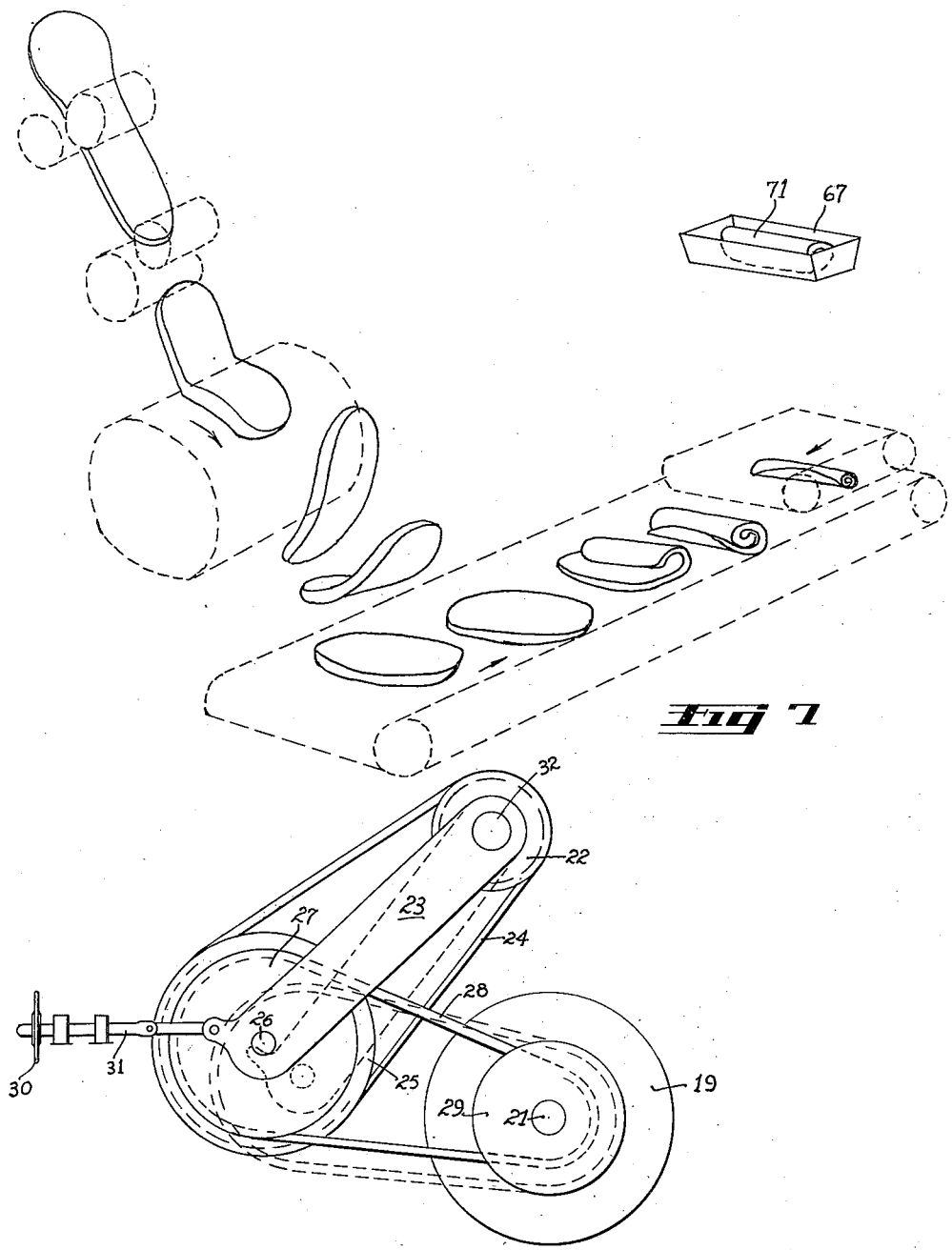
INVENTOR.
HERBERT C. RHODES
BY
ATTORNEY Patented Dec. 19, 1950

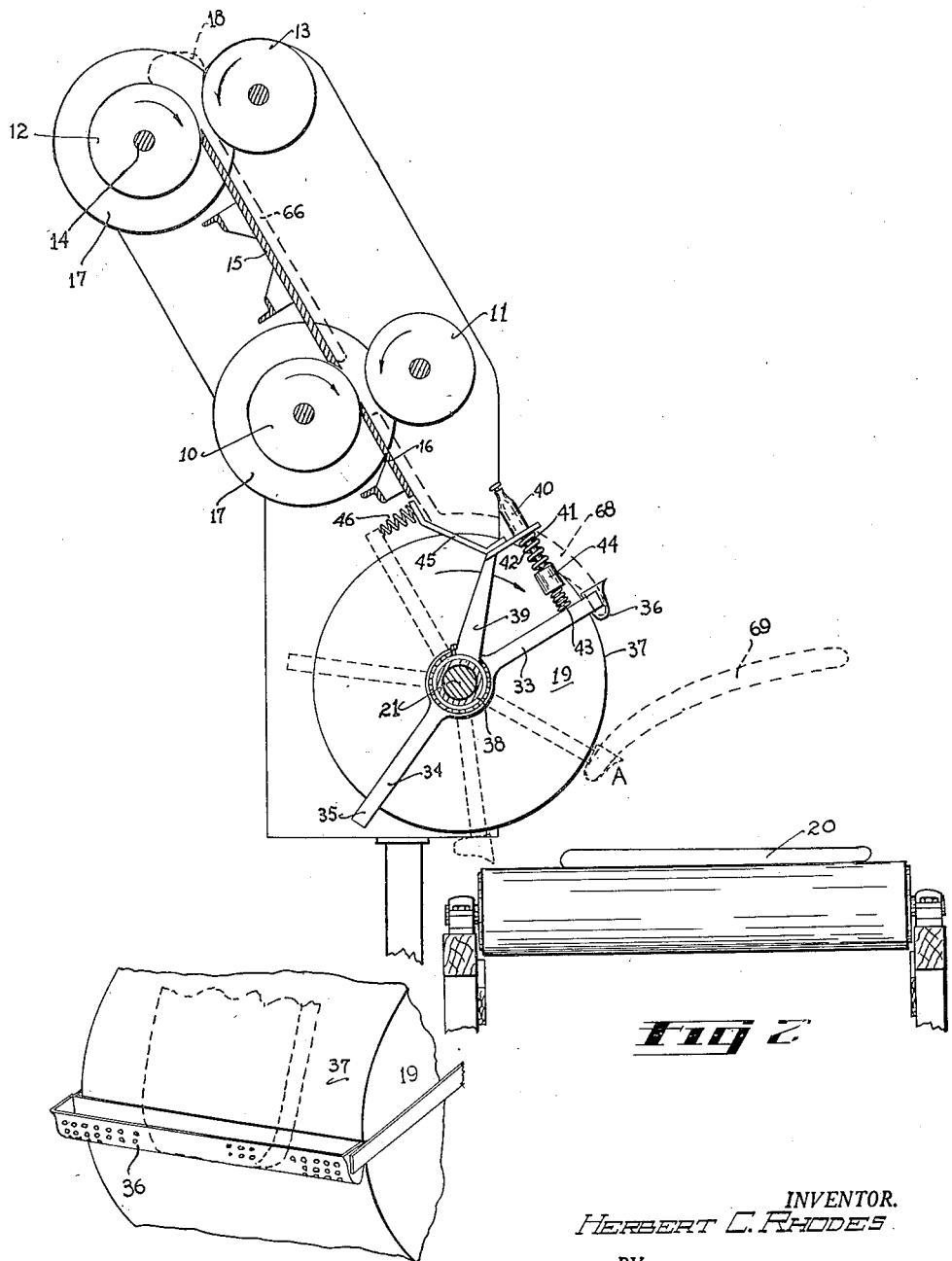

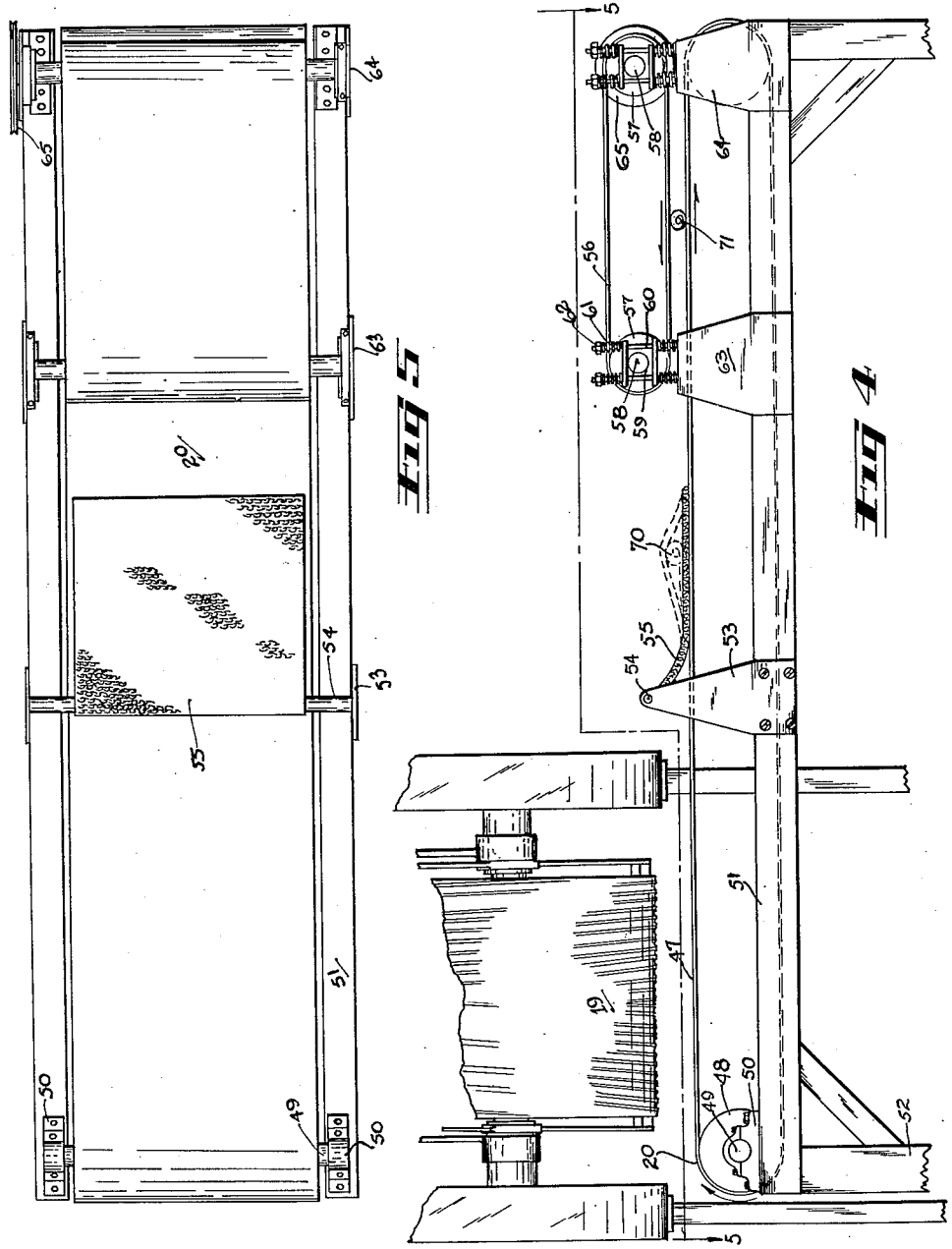

2,534,734

UNITED STATES PATENT OFFICE 2,534,734

METHOD OF MAKING BREAD

Herbert C. Rhodes, Portland, Oreg., assignor to The Standard Stoker Company, Inc., a corporation of Delaware Application February 10, 1945, Serial No. 577,223

5 Claims. (Cl. 107—54)

This invention relates generally to the bakers' art and particularly to a method of making bread.

The main object of this invention is to devise a process for preparing bread for pans preparatory to baking, in a manner that the texture thereof will be uniformly fine throughout and that all large voids will be eliminated.

The second object is to construct an apparatus by means of which the foregoing method may be practiced and whereby a mass of dough may be thoroughly worked for the purpose of extracting the air therefrom and rendering uniform throughout the texture of the loaf when finally baked.

The third object is to construct a device of the class described which can be made as an attachment for existing types of dough molders or loaf forming machines.

I accomplish these and other objects in a manner set forth in the following specification as illustrated in the accompanying drawings, in which:

Fig. 2 is a broken section taken along the line 2—2 in Fig. 1.

Fig. 3 is a fragmentary perspective of the loaf shortening stop.

Fig. 4 is a front elevation of the loaf rolling portion of the device.

Fig. 5 is a horizontal section taken along the line 5—5 in Fig. 4.

Fig. 6 is a side elevation of the speed changing device.

Fig. 7 is a somewhat diagrammatic perspective view showing a piece of dough in various stages of its travel through the steps of the process.

Similar numerals refer to similar parts throughout the several views.

Figure 1:
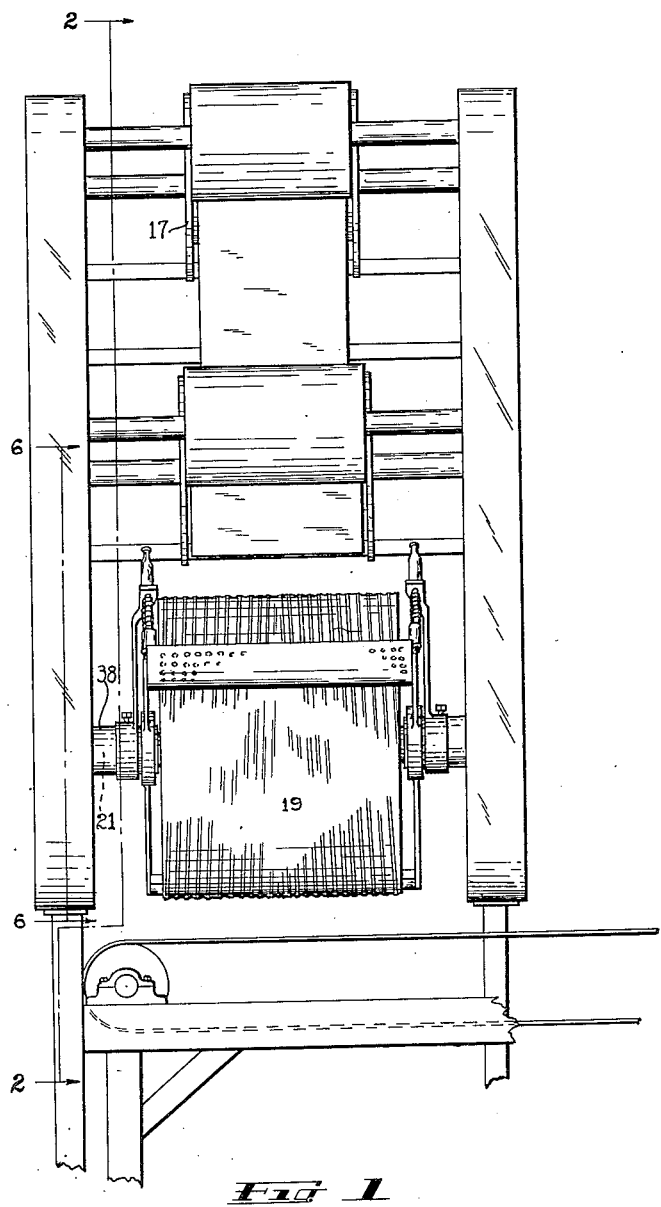
Fig. 1 is a front elevation of the device.

Referring in detail to the drawing there is shown only those portions of the loaf preparing machine as are pertinent to this invention, and this consists of the live rolls 10, 11, 12, and 13 which are mounted on their respective shafts such as the shaft 14 and driven in any desired manner. Between the rolls 10 and 12 and below the rolls 10 are the plates 15 and 16, over which the dough can pass during and after the time it passes through the rolls 10 to 13 inclusive. Suitable guides 17 are placed along the sides of the rolls 10 and 12 to limit the width to which the dough 18 can be rolled. The mechanism thus far described is commonly formed on existing types of loaf forming machines.

Referring particularly to my invention, same will be seen to consist of a loaf shortening drum 19 and a conveyor 20. The drum 19 is mounted on the shaft 21 of a variable speed drive mechanism similar to that shown in Fig. 6 in which power is supplied from the pulley 22, which is mounted on one end of an arm 23 through the belt 24 to the sheave 25, which is mounted on the opposite end of the arm 23. The sheave 25 is mounted on the same shaft 26 as is the variable speed sheave 27, whose belt 28 passes around the variable speed sheave 29 on the shaft 21. The belt 28 is kept in tension by means of the tightener 30 operating on the rod 31, which is attached to the arm 23. The arm 23 is capable of swinging about the center of the shaft 32.

Such contrivances are common in the market, a popular form of which is known as the Reeves variable speed drive, which operates on the principle of changing the pitch line of the driving and driven pulleys. No claim is made to this element and the explanation is given merely to show a form of variable speed drive for the shaft 21.

Mounted on the shaft 21 are the radial arms 33, to which are attached the counter balance arms 34, the ends of which are joined by the counter balance 35. The ends 33 are joined by the perforated trough 36, which is free to move with relation to the surface 37 of the drum 19. The shaft 21 is contained within the tubular bearing 38, on which are mounted a pair of arms 39 which support the dash pots 40 in which are disposed the pistons 41, which are outwardly urged by the springs 42. A spring 43 is interposed between the piston head 44 and its respective arm 33.

Also secured to the arms 39 are the brackets 45, which carry the rebound springs 46 against which the counter weight 35 strikes when the trough 36 reaches its lowermost point of travel.

In Figs. 4 and 5 are shown the conveyor 20, preferably of fabric and mounted on the rolls 48, to which motion is imparted through any convenient source (not shown). The rolls 48 are mounted on the shaft 49 and are supported by the bearing 50, which in turn are mounted on the base 51 and held at an elevation by the supports 52 which will bring the top run of the conveyor 20 just below the bottom of the drum 19. On the base 51 are secured the vertical brackets 53, across which is mounted a rod 54, to which is attached a flexible wire cloth 55 which lies upon the conveyor 20.

Toward the discharge end of the conveyor 20 and directly above same is a loaf shaping belt 56, between whose lower run and the conveyor 20 the loaf is rolled as it is discharged from the conveyor 20. The belt 56 is carried on the rollers 57, whose shafts 58 journal in the spring mounted bearing 59, which are slidable on the bolts 60 on whose upper ends are placed the spring 61, which is held down by the nuts 62. By this arrangement the pressure of the belt 56 can be regulated to a nicety.

The bolts 60 are supported by the brackets 63 and 64 on the sides of the base 51. A drive pulley 65 is secured on a shaft 58 and power is supplied thereto from a convenient source (not shown).

The operation of the device is as follows. Assuming that dough has been formed into pieces of the correct weight to produce the desired loaf of bread, and that the chunk of dough 18 has been presented to the rolls 12 and 13, between which it is forced to pass by the rotation of these rolls, it follows that the dough will be flattened out into a long narrow strip 66, and this will be found to be much longer than the pan 67 into which it is finally to be placed ready for baking. It is, however, confined to a given width by the guides 17 until it finally contacts the surface 37 of the slower moving drum 19. This slower movement serves to thicken the dough 68 which finally engages the trough 36, which being free to turn, is carried around thereby to the position shown as A in Fig. 2.

The sheeting rolls 10—11 and 12—13 are so spaced with respect to one another as to engage a mass of dough 18 and compress same into a relatively thin dough sheet 66. By maintaining the rolls 10—11 and 12—13 in closely spaced relation the dough sheet 66 is, during the sheeting operation, formed with a uniformly smooth texture which is obtainable only through a thorough and complete de-gassing of the dough sheet. It is through the action of the rolls 10—11 and 12—13 that an elongated dough sheet 66 is obtained, which sheet is elongated to such a length that it would not fit within the baking pan. When the dough sheet 66 emerges from the sheeting rolls 10—11 and engages the peripheral surface 37 of the drum 19 the rate of movement of said drum will tend to shorten the dough sheet 66. The shortening of the dough sheet 66 upon its engagement with the drum 19 is due to the difference in rate of speed between the drum 19 and sheeting rolls 10—11. The forward or leading edge of the dough sheet 66 is adapted to engage the surface 37 of the drum 19 while the rear end or trailing portion of the dough sheet is still engaged by the rollers 10—11. Thus as the leading edge of the dough sheet engages the drum 19 the difference in rate of speed between the drum 19 and the rollers 10—11 will produce a shortening or backing up of the dough sheet as it is carried around by the drum 19. That is, the difference in the rate of speed of the drum 19 and the rollers 10—11 will cause the dough sheet 66 to back up or spread out and the elongated dough sheet will be shortened from its leading to its trailing edge as the entire dough sheet finally engages the surface 37 of the drum 19.

The trough 36 carried by the arms 33 is adapted to move independently with respect to the rotating drum 19. As shown in Figure 2, the leading edge of the dough sheet 66 engages the trough 36 which engagement subjects the leading edge of the dough sheet to a pressure which is in a direction opposite to the direction of movement of the dough sheet. That is, at the time of engagement of the leading edge of the dough sheet with the trough 36 the counter balance weights 35 will prevent the trough from moving around the surface of the drum 19 and the trough 36 will remain in this position until a sufficient amount of the dough sheet has been carried forward by the drum 19 to overcome the counter balance 35, at which time the trough 36 will start to move around the surface of the drum 19. During this period of non-movement by the trough 36 the leading edge of the dough sheet will tend to be squared up as it engages the trough 36 and pressure will be directed to the dough sheet by means of the trough 36 and the counter balance 35 which pressure will tend to shorten still further the dough sheet 66. In fact the shortening of the dough sheet by the trough 36 and counter balance 35 will tend not only to square up the leading edge of the dough sheet but also the trailing edge. Before the trough 36 starts to move around the periphery 37 of the drum 19 there must be a sufficient amount of the dough sheet supported by said trough before the action of the counter balance 35 can be overcome, and it is during this period that a pressure is imparted to the dough sheet in a direction opposite to the line of travel of the dough sheet that causes the dough sheet to be shortened.

As the trough 36 starts to move about the peripheral surface 37 of the drum 19 the trailing or rear end portion of the dough sheet 66 is still in engagement with the drum 19. As the drum 19 continues to rotate and carries the trailing or rear end portion of the dough sheet the trough is forced about the surface 37 of the drum 19 due to the weight of the dough sheet which is being supported by said trough. At approximately the position designated as A in Figure 2, the trailing or rear end portion of the dough sheet will be thrown from the peripheral surface 37 of the drum 19 towards the conveyor 20. During this action the trough 36 will continue to move about the drum's surface so that when the dough sheet, through the flipping action, assumes approximately a horizontal position the leading edge of the dough sheet will leave the trough 36 so that the entire dough sheet will be deposited upon the conveyor 20. After the dough sheet leaves the trough 36 the counter balance 35 will cause the trough to be returned to its original or starting position, such as shown in full lines in Figure 2, where said trough will be ready to engage the next sheet of dough that is carried by the surface 37 of the drum 19.

The dough sheet upon engaging the conveyor 20 is carried along in a direction normal to its length until it passes under the wire cloth 55 and is formed into a somewhat imperfect roll 70, which is, however, the correct pan length. When the roll 70 escapes from the end of the wire cloth 55, it passes under the belt 56 and is rolled to cylindrical form, from whence it is discharged onto a table or conveyor (not shown), and put into pans 67 ready for the oven. The unbaked loaf 71 will be found, upon examination, to have the form of a true cylinder of uniform texture throughout and devoid of irregularities in the air pocket sizes. It will readily be seen that an important feature of the device is the ability to shorten the strip to pan length after it has been rolled to an excessive length, and this is accomplished by controlling the relative speeds of the rolls 10 to 14 inclusive, with regard to the surface speed of the drum 19, and also the action of the trough 36 in imparting or subjecting the dough sheet to a pressure from the leading to the trailing edge for further shortening said dough sheet.

I am aware that numerous minor changes in details can be employed without departing from the spirit of this invention. It is therefore not my intention to be limited to the precise form shown herein, but I do intend to cover such forms and modifications of the device as fall fairly within the appended claims.

I claim:

1. A method of preparing dough for baking which consists in moving divided masses of dough in spaced relation in a continuous path, compressing each mass of dough to form an elongated strip while moving the strip at a chosen speed in a portion of said path, engaging said strip along its length from leading end to trailing end by moving said strip onto a surface in another portion of said path moving at a speed slower than said chosen speed to progressively shorten the length of said strip and then inverting the shortened strip.

2. A method of preparing dough for baking consisting in compressing spaced moving masses of dough into sheets by application of pressure progressively from the leading to the trailing edge of the dough masses, while moving the masses of dough and the sheets in a continuous path at a chosen speed, then engaging successively formed sheets from leading to trailing edge, during their continuous movement, with a surface moving at a surface speed slower than the speed first mentioned to shorten the length of said sheet and inducing a further compression of the leading end of the shortened dough sheet by subjecting the leading edge of said shortened sheet to pressure whereby to additionally shorten the length of the sheet.

3. A method of preparing dough for baking consisting in compressing spaced masses of dough into elongated sheets while moving the masses of dough and the sheets in a continuous path at a chosen speed in a portion of said path, engaging successively formed sheets along their length from leading to trailing edge by moving said sheets onto a surface in another portion of said path moving at a speed slower than said chosen speed to progressively shorten the length of said sheet, and inducing a further compression of the shortened dough sheet by subjecting the leading edge of the sheet to pressure to further shorten the length of said sheet, then inverting the shortened sheet.

4. A method of preparing dough for baking consisting in compressing a mass of dough into an elongated sheet while moving the sheet at a chosen speed in a downwardly inclined path, engaging said sheet from the leading to the trailing edge with a moving surface having a surface speed of a rate different than said chosen speed, subjecting the leading edge of said sheet to pressure for inducing a compression of the sheet to shorten the length of said sheet then inverting said sheet and then coiling the sheet 5. A method of preparing dough for baking consisting in moving spaced masses of dough in a continuous path, compressing successive masses of dough to form sheets of dough while continuing to move the sheets in said path, moving successively formed sheets in a downwardly arcuate path and also subjecting the leading edge of each sheet to a pressure in a direction opposite to the direction of said arcuate path of movement for inducing a compression of the sheet to shorten the length of said sheet and to bring about an inversion of said sheet.

HERBERT C. RHODES.

REFERENCES CITED

The following references are of record in the file of this patent:

UNITED STATES PATENTS

| Number | Name | Date |
| --- | --- | --- |
| 203,363 | Muth | May 7, 1878 |
| 787,274 | Burns | Apr. 11, 1905 |
| 1,420,486 | Kennedy | June 20, 1922 |
| 1,432,874 | Lauterbur | Oct. 24, 1922 |
| 1,536,224 | Lauterbur et al. | May 5, 1929 |
| 1,790,589 | McCarthy | Jan. 27, 1931 |
| 2,034,346 | Lauterbur | Mar. 17, 1936 |
| 2,373,012 | Burdett et al. | Apr. 3, 1945 |